US012584527B2

(12) United States Patent
Becker et al.

(10) Patent No.:  US 12,584,527 B2
(45) Date of Patent:     Mar. 24, 2026

(54) BRAKE CALIPER WITH A COVER

(71) Applicant: ZF Active Safety GmbH, Koblenz (DE)

(72) Inventors: Marco Becker, Oberduerenbach (DE); Florian Roessinger, Neuwied (DE); Philipp Schwenzer, Urmitz (DE)

(73) Assignee: ZF Active Safety GmbH, Koblenz (DE)

( * ) Notice: Subject to any disclaimer, the term of this patent is extended or adjusted under 35 U.S.C. 154(b) by 546 days.

(21) Appl. No.: 17/840,110

(22) Filed: Jun. 14, 2022

(65) Prior Publication Data

US 2022/0397170 A1     Dec. 15, 2022

(30) Foreign Application Priority Data

Jun. 15, 2021    (DE) .......................... 102021206087.0

(51) Int. Cl.
F16D 65/00          (2006.01)
F16D 55/00          (2006.01)
(52) U.S. Cl.
CPC ..... F16D 65/0068 (2013.01); F16D 65/0081 (2013.01); *F16D 2055/0016* (2013.01); *F16D 2055/0037* (2013.01); *F16D 2250/0084* (2013.01)
(58) Field of Classification Search
CPC ............. F16D 65/0068; F16D 65/0081; F16D 2055/0016; F16D 1/0835; F16B 21/12; F16B 21/16; F16B 21/20; F16B 21/086;

F16B 21/125; F16B 2/22; F16L 37/084; F16L 37/0841; F16L 37/0842; F16L 37/0847; F16L 37/086
See application file for complete search history.

(56) References Cited

U.S. PATENT DOCUMENTS 1,830,695 A * 11/1931 Gagnon ............... H01R 13/405
                                                             29/874
2,271,266 A *  1/1942 Kost ........................ G05G 1/12
                                                             182/228.1

(Continued)

FOREIGN PATENT DOCUMENTS

DE          164322 A  *  9/1933
DE          1773309 U     8/1958

(Continued)

*Primary Examiner* — Vishal R Sahni
(74) *Attorney, Agent, or Firm* — Kristin L. Murphy

(57) ABSTRACT

The disclosure relates to a brake caliper for a disk brake, comprising a support structure having a bridge and at least one bridge finger. The at least one bridge finger has a brake lining side, an outer side, and a bore introduced into the outer side. The bore has a bore wall, a bore groove let into the bore wall. A cover having a pin projects into the bore and a pin groove extending into the pin circumferential surface, A sleeve is arranged between the bore wall and the pin circumferential surface and has a sleeve body The sleeve has a spring arm which is bent outward in the radial direction away from the sleeve body and/or a spring arm which is bent inward in the radial direction away from the sleeve body. The outwardly bent spring arm engages into the bore groove and/or the inwardly bent spring arm engages into the pin groove.

4 Claims, 5 Drawing Sheets

(56)           References Cited

U.S. PATENT DOCUMENTS

| | | | | | |
|---|---|---|---|---|---|
| 2,529,219 | A | * | 11/1950 | Kost | F16B 13/02 |
| | | | | | 16/DIG. 30 |
| 2,590,264 | A | * | 3/1952 | Meyers | F16B 21/07 |
| | | | | | 411/908 |
| 3,299,737 | A | * | 1/1967 | Hurlin | B60S 1/24 |
| | | | | | 74/595 |
| 3,329,452 | A | * | 7/1967 | Ammon | G05G 1/12 |
| | | | | | 403/361 |
| 3,338,604 | A | * | 8/1967 | Buren, Jr. | F16B 2/02 |
| | | | | | 16/DIG. 30 |
| 3,389,923 | A | * | 6/1968 | Love, Jr. | F16L 37/088 |
| | | | | | 29/451 |
| 3,415,155 | A | * | 12/1968 | Riddell | F16C 33/20 |
| | | | | | 411/548 |
| 3,580,619 | A | * | 5/1971 | Maltais | F16D 1/0835 |
| | | | | | 403/372 |
| 3,672,708 | A | * | 6/1972 | Zemberry | F16L 37/084 |
| | | | | | 403/361 |
| 3,730,571 | A | * | 5/1973 | Van, Jr. | G05G 1/12 |
| | | | | | 403/361 |
| 3,768,845 | A | * | 10/1973 | Gilliland | F16B 17/006 |
| | | | | | 403/372 |
| 3,961,855 | A | * | 6/1976 | Basile | F16D 1/0835 |
| | | | | | 403/372 |

| | | | | | |
|---|---|---|---|---|---|
| 4,189,248 | A | * | 2/1980 | Sully | G05G 1/12 |
| | | | | | 16/DIG. 30 |
| 4,750,878 | A | * | 6/1988 | Nix | F16B 21/16 |
| | | | | | 411/908 |
| 5,115,375 | A | * | 5/1992 | Garay | H05K 7/142 |
| | | | | | 439/82 |
| 2004/0155162 | A1 | * | 8/2004 | Schneider | F16B 19/02 |
| | | | | | 248/220.21 |
| 2011/0232342 | A1 | * | 9/2011 | Tong | E05B 27/0014 |
| | | | | | 70/449 |
| 2015/0355668 | A1 | * | 12/2015 | Bekaert | G05G 1/12 |
| | | | | | 74/511 R |
| 2019/0017528 | A1 | * | 1/2019 | Wersland | B23B 31/11 |

FOREIGN PATENT DOCUMENTS

| | | | | | |
|---|---|---|---|---|---|
| DE | 2950594 | A1 | * | 7/1981 | |
| DE | 236487 | A5 | | 6/1986 | |
| DE | 19652933 | A1 | * | 6/1998 | F16D 65/0979 |
| DE | 19803918 | A1 | * | 8/1999 | F16L 37/091 |
| DE | 102004048436 | A1 | | 4/2006 | |
| DE | 102013020750 | A1 | | 6/2015 | |
| DE | 102006033240 | B4 | | 3/2016 | |
| EP | 3712447 | A1 | | 9/2020 | |
| FR | 1531248 | A | * | 6/1968 | |
| GB | 795479 | A | * | 5/1958 | |
| WO | 2020128228 | A1 | | 6/2020 | |

* cited by examiner

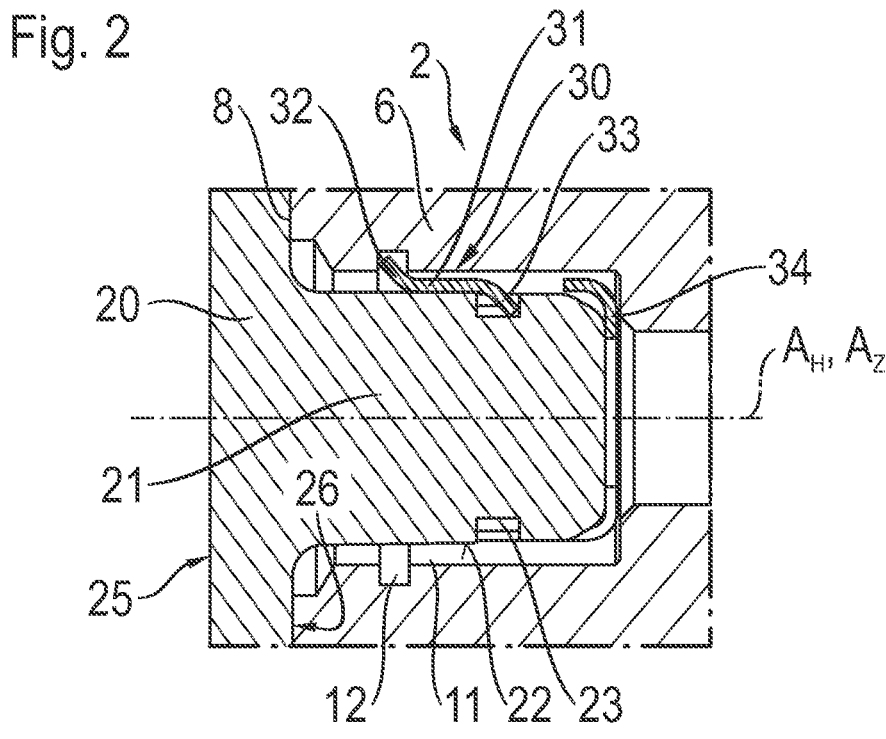

BRAKE CALIPER WITH A COVER

CROSS-REFERENCE TO RELATED APPLICATION

This application claims priority to German Priority Application No. 102021206087.0, filed Jun. 15, 2021, the disclosure of which is incorporated herein by reference in its entirety.

TECHNICAL FIELD

The disclosure relates to a brake caliper for a disk brake with a cover fastened to the brake caliper, in particular to the bridge finger or fingers of the brake caliper. The disclosure relates further to a mounting method for mounting such a cover.

BACKGROUND

Disk brakes are widely used as wheel brakes in vehicles, Depending on the design of the wheels, parts of the disk brake are often visible. Where floating caliper disk brakes are used, part of the floating caliper and in turn part of the bridge and associated bridge fingers are visible through the wheel construction. The bridge fingers, or optionally gaps between the bridge fingers, can be covered by a cover, also known as a logo plate, which is mounted on the brake caliper, for example on the bridge fingers. Such a cover performs protection functions (e.g. dust protection) and provides a surface for an inscription or a logo, for example a company logo.

Various solutions for fastening such a cover to a brake caliper are known from the prior art.

DE102006033240B4 discloses a screwless fastening of a (cast) company emblem to a brake caliper.

DE102013020750A1 describes that the fastening of an identification part can take place by a pin-shaped projection which is fixed solely by frictional forces.

WO20128228A1 describes a protective plate fastened to a brake caliper by a screw connection.

SUMMARY

What is needed is a brake caliper of the type referred to at the beginning in which the cover is held securely and precisely and can be mounted in a simple manner.

The brake caliper according to one exemplary arrangement of the disclosure for a disk brake comprises a support structure having a bridge and at least one bridge finger which has a brake lining side, an outer side, and a bore introduced into the outer side and having a bore wall. The brake caliper further comprises a bore groove extending into the bore wall. The brake caliper also comprises a cover having a pin which projects into the bore and a pin groove extending into the pin circumferential surface. The brake caliper additionally has a sleeve which is arranged between the bore wall and the pin circumferential surface and which has a sleeve body. The sleeve is so configured that it has a spring arm which is bent outward in a radial direction away from the sleeve body or a spring arm which is bent inward in the radial direction away from the sleeve body, or it is so configured that it has both a spring arm which is bent outward in the radial direction away from the sleeve body and a spring arm which is bent inward in the radial direction away from the sleeve body. The outwardly bent spring arm engages into the bore groove and/or the inwardly bent spring arm engages into the pin groove.

Sleeves are components with an annular cross section and a certain length. Such a sleeve thus has an inner cavity which is used to accommodate components. The sleeve body is here to be understood as being a base structure of the sleeve, that is to say an annular structure with its longitudinal extent.

It is an advantage of this exemplary configuration that, by the engagement of the spring arm or arms into the groove or grooves, the cover is oriented precisely relative to the brake caliper, or to an outer side of the bridge finger or bridge fingers. Furthermore, the cover is held securely by the engagement of the spring arm or spring arms into the groove or grooves. Mounting of the cover on the brake caliper takes place by simply fitting or pressing the components together.

In one exemplary arrangement, the bore groove and/or the pin groove is in the form of a circumferential annular groove.

The sleeve has a sleeve longitudinal axis. In one exemplary arrangement, the bending angle $\alpha1$ of the outwardly bent spring arm relative to the sleeve longitudinal axis in the unloaded state is less than 90°. In a further exemplary arrangement, the bending angle $\alpha1$ is less than 60°. Alternatively, the bending angle $\alpha2$ of the inwardly bent spring arm relative to the sleeve longitudinal axis in the unloaded state is less than 90°. In a further exemplary arrangement, the bending angle $\alpha2$ is less than 60°.

In one exemplary arrangement, both the bending angles $\alpha1$ and $\alpha2$, that is to say the bending angle of the outwardly bent spring arm and the bending angle of the inwardly bent spring arm, relative to the sleeve longitudinal axis in the unloaded state are less than 90°. In a further exemplary arrangement, the respective bending angles $\alpha1$ and $\alpha2$ are less than 60°.

An unloaded state is present, for example, when the sleeve is not inserted into the bore and when no force is acting on the spring arms.

In one exemplary arrangement, the inwardly bent spring arm is so configured and oriented that the bending angle $\alpha2$ of the inwardly bent spring arm decreases when the pin is inserted into the sleeve and/or the outwardly bent spring arm is so configured and oriented that the bending angle $\alpha1$ of the outwardly bent spring arm decreases when the sleeve is inserted into the bore.

The advantage of this exemplary configuration of the bending angle $\alpha1$ and/or $\alpha2$ is, on the one hand, that the insertion process is facilitated and thus the ease of mounting is increased. On mounting, the already pre-bent spring arms are more easily applied to the sleeve body and the components can more easily be pushed into the final fixing position. On the other hand, the spring arms oriented in this manner counteract an undesirable backward movement of the sleeve and the pin out of the bore once mounting is complete and thus assist with secure holding of the cover on the brake caliper.

In one exemplary arrangement, the radially outwardly bent spring arm presses with its spring force into the bore groove and/or the radially inwardly bent spring arm presses with its spring force into the pin groove.

As a result of the joining, the spring arms receive a prestress in that they are each forced in the direction of the sleeve body and, on engaging into the respective groove, press into the groove and thus lock together the components to be joined.

In one exemplary arrangement, the sleeve has a longitudinal slit which runs through the entire sleeve length. In particular, the split sleeve can be seated on the pin or in the bore under prestress.

The longitudinal slit is useful for facilitating mounting of the sleeve on the pin. A prestressed form assists with the secure holding of the sleeve on the pin or of the sleeve in the bore.

In one exemplary arrangement, the groove width of the pin groove is greater than the groove width of the bore groove. Alternatively, the pin groove may be arranged offset with respect to the bore groove in the axial direction, based on the longitudinal axis of the pin, toward the end face of the pin. It is also possible that the groove width of the pin groove is greater than the groove width of the bore groove and that the pin groove is arranged offset with respect to the bore groove in the axial direction, based on the longitudinal axis of the pin, toward the end face of the pin. In one of these exemplary arrangements, the pin groove could also extend to the end of the pin and be delimited there by a cover part adjoining the pin.

The use of a sleeve creates an ideal force path between the pin and the bore with regard to extraction forces which act axially and encourage undesirable dislodging of the cover. As a result of the above-mentioned configuration and arrangement of the grooves, the force transmission points, when seen axially, are arranged offset with respect to one another and the corresponding components are in this manner supported axially against one another via the sleeve.

In one exemplary arrangement, the bore groove has a groove base which is so inclined relative to the bore wall that the radial distance between the bore wall and the groove base decreases in the direction toward the outer side. Or the pin groove has a groove base which is so inclined relative to the pin circumferential surface that the radial distance between the pin circumferential surface and the groove base decreases in the direction toward the end face of the pin. The groove base of the bore groove and the groove base of the pin groove can also each have the described inclination.

Due to this inclination or these inclinations, variations in the dimensions or shape of the bent spring arm or arms or varying positions of the spring arms on the sleeve, for example, can be compensated for. If, for example, a spring arm has a bending angle which is smaller than the specified bending angle or if a spring arm does not have the specified length, such an inclination of the groove base has the effect that, when an extracting force acts on the cover and thus on the pin and the sleeve, the spring arm does not first have to pass through the entire groove width before the desired holding action is achieved. Conversely, if a specified bending angle is exceeded or if a spring arm exceeds a specified length, the groove in question is also able to accommodate such a spring arm and ensure the desired holding force because of the inclined groove base.

In one exemplary arrangement, the width of the bore groove increases from the groove base toward the bore wall in that a side wall of the bore groove or a portion thereof, or both side walls of the bore groove or portions thereof, is/are not oriented at a right angle to the bore wall; or the width of the pin groove increases from the groove base toward the pin circumferential surface in that a side wall of the pin groove or portions thereof, or both side walls of the pin groove or portions thereof, is/are not oriented at a right angle to the pin circumferential surface.

It is also possible that the bore groove and the pin groove each have the described widening characteristic.

If a side wall faces the inside radius of a spring arm, its above-described non-right-angled or partially non-right-angled orientation has the effect that the spring arm in question is able to engage into the respective groove unhindered. If a side wall faces the end of a spring arm, the described non-right-angled or partially non-right-angled orientation has the effect that the end of the spring arm in question can pivot unhindered into the respective groove, for example even in the case of a longer spring arm length lying within the tolerance range.

Adjoining the inwardly bent spring arm and/or the outwardly bent spring arm there can be a spring arm prolongation which is integrally connected to the respective spring arm, forms a bending angle with the respective spring arm and increases the projection of the respective spring arm in the radial direction. By virtue of this configuration measure, the spring path in the radial direction is increased and the holding function is enhanced.

In one exemplary arrangement, the sleeve has on one of its end faces a lip which is directed inward in the radial direction and on which the end face of the pin rests.

In one exemplary arrangement, the lip is formed along its bending edge by a plurality of folded-over portions.

The lip provides for precise axial positioning of the sleeve on the pin and thus of the inwardly bent spring arm relative to the pin groove and ensures that the sleeve is reliably held on the pin in a particular manner. Furthermore, this type of positioning of the sleeve on the pin also provides for precise axial positioning of the outwardly bent spring arm relative to the bore groove and thus, overall, low-vibration and secure seating of the cover relative to the brake caliper.

In one exemplary arrangement, the cover has a visible side and a contact side, wherein the pin is arranged on the contact side and wherein the cover rests with its contact side on the outer side of the bridge finger.

The fact that the cover rests on the bridge finger, in conjunction with other features according to the disclosure, has the effect that the cover is held on the brake caliper in such a manner that it is free from play and/or free from vibration. This leads to a permanently secure connection.

In one exemplary arrangement, the sleeve has a plurality of radially inwardly bent spring arms arranged distributed over the sleeve circumference and/or a plurality of radially outwardly bent spring arms arranged distributed over the sleeve circumference.

In one exemplary arrangement of the disclosure, the sleeve with its sleeve body is fitted into the pin groove and is fixed by the pin groove in the axial direction, based on the longitudinal axis of the pin. In one exemplary arrangement, the sleeve in this case has on one of its end faces at least two incisions which do not cut through the sleeve and which are arranged spaced apart from one another along the sleeve circumference, wherein a sleeve portion located between the at least two incisions forms the outwardly bent spring arm and wherein a further sleeve portion located between the at least two incisions is part of the sleeve body fitted into the pin groove.

The mounting method according to the disclosure for producing a brake caliper according to the above-mentioned arrangements comprises the steps:

fitting the sleeve onto the pin in such a manner that the inwardly bent spring arm engages into the pin groove and/or the radially inwardly directed lip comes to rest on the end face of the pin, mounting the cover on the brake caliper by inserting the pin provided with the sleeve into the bore in such a manner that the outwardly bent spring arm engages into the bore groove and the cover rests with its contact side on the outer side of the bridge finger.

Mounting can thus be carried out without being susceptible to error, since the parts to be joined simply have to be pressed together or into one another in succession as far as they will go. The parts then automatically have the correct positioning relative to one another.

BRIEF DESCRIPTION OF DRAWINGS

Various exemplary arrangements of the brake caliper according to the disclosure and an example of the mounting method according to the disclosure will be explained hereinbelow with reference to the schematic illustrations of FIGS. 1 to 8:

FIG. 2 is a partial view of an exemplary arrangement of the disclosure, in a sectional view;

FIG. 3 shows, on an enlarged scale, a partial region of an exemplary arrangement, in the form of a section;

DETAILED DESCRIPTION

Figures 1, 4A, 4B:
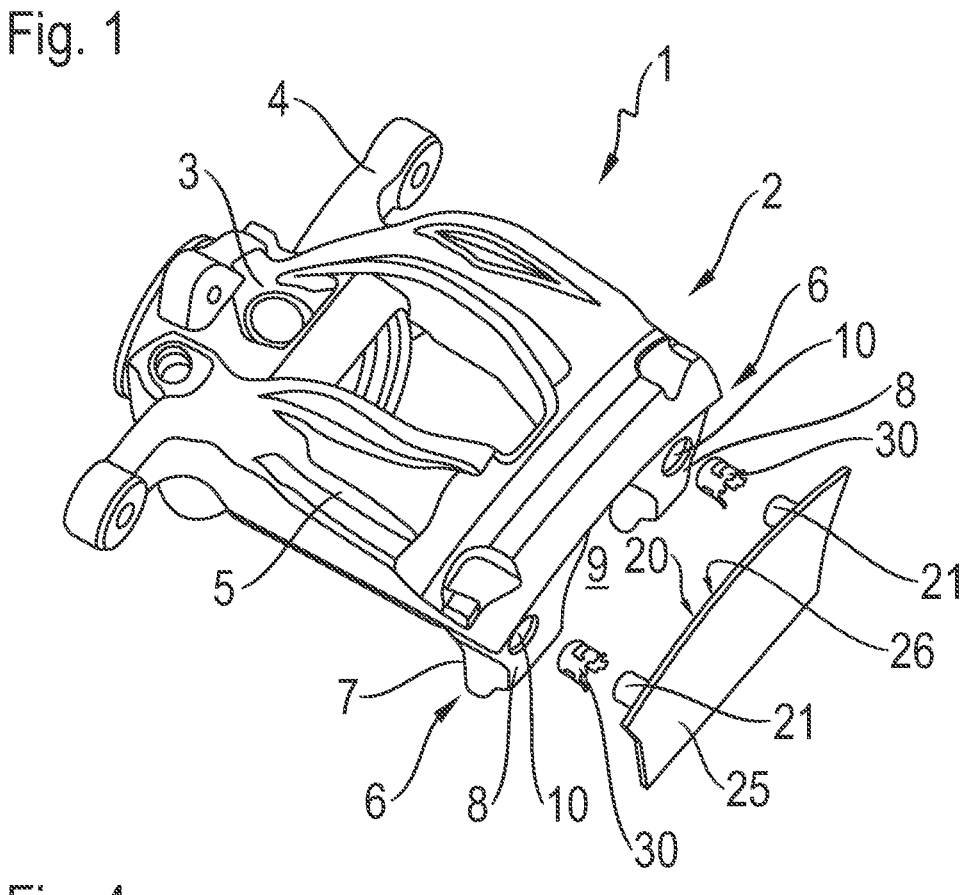
FIG. 1 shows an exemplary arrangement of the brake caliper according to the disclosure with a cover, in the manner of an exploded view.
FIGS. 4a to 4b show various exemplary arrangements of the sleeve according to the disclosure.

In an exemplary arrangement of the disclosure, a cover 20 is mounted on a brake caliper 1, as is shown, for example, in FIG. 1. The brake caliper is in the form of a cast metal part. In order better to illustrate the corresponding construction, the parts are shown in an exploded view. The brake caliper 1 comprises a support structure 2 with an actuator holder 3 for holding a brake actuator, a brake caliper fastening 4 and a bridge 5. Adjoining the bridge are two bridge fingers 6, which are arranged spaced apart from one another. The bridge fingers 6 have a brake lining side 7 and an outer side 8, which serves as a support for the cover 20. In the final mounted state on a vehicle, the brake piston, the brake linings and the brake disk (not shown) are arranged between the actuator holder 3 and the brake lining side 7.

A bore 10 is introduced into the outer side 8 of each of the bridge fingers 6. The size of the cover 20 is such that it covers the bridge fingers 6 and the space 9 between bridge fingers 6. The cover 20 has a visible side 25 and a contact side 26 and two pins 21, which are arranged corresponding to the bores 10. The visible side 25 is remote from the brake caliper 1, while the contact side 26 rests on the outer side 8 of the bridge fingers 6. This arrangement is also shown in FIGS. 2 and 3. A sleeve 30 made of metal is fitted to each of the pins 21, and the pins 21 with the sleeves 30 are inserted into the bores 10.

As is shown in FIG. 2, the pin 21 has a pin groove 23 in the form of an annular groove and the bore 10 has a bore groove 12 in the form of an annular groove, The sleeve 30 has at its end face 40 a radially inwardly bent lip 34 which rests with its inner side on the end face 24 of the pin 21 and thus orients the sleeve 30 precisely on the pin 21. The lip 34 is also shown in FIGS. 4a and 4b. The sleeve 30 further has on its opposite end face projections which are arranged distributed over the sleeve circumference and form radially outwardly bent spring arms 32. The ends of the spring arms 32 engage into the bore groove 12. Axially spaced apart from the outwardly bent spring arms 32, the sleeve 30 has sleeve webs which are arranged distributed over the sleeve circumference and are partially isolated and which form radially inwardly bent spring arms 33. The ends of the spring arms 33 engage into the pin groove 23. By virtue of the lip 34 and the positioning of the grooves 12, 23 and of the spring arms 32, 33, the cover is held precisely and securely on the brake caliper. The spring arms 32, 33 hold the pins 21 together with the sleeves 30 and thus the cover 20 in the bores 10 by positive engagement. In the exemplary arrangement, the spring arms 32, 33 are each bent at approximately 45°, measured from the sleeve longitudinal axis AH. For the purpose of greater clarity, the angles $\alpha 1$ and $\alpha 2$ are each marked in FIG. 3 on a line offset parallel to a sleeve longitudinal axis AH. Owing to the inclined position of the spring arms 32, 33, which is the result of the bend, the insertion of the pin 21 into the sleeve 30 and of the sleeve 30 into the bore 10 is ideally possible. Furthermore, the spring arms 32, 33 effect vibration-free and secure holding, since they are applied to the sleeve body 31 to a certain extent as a result of the mounting of the components. In the end position, the spring arms 32, 33, owing to their spring force, are pressed into the respective groove 12, 23 and lock the corresponding components together.

The sleeves 30 are split by a slit 36 which extends parallel to the sleeve longitudinal axis AH.

Figure 5:
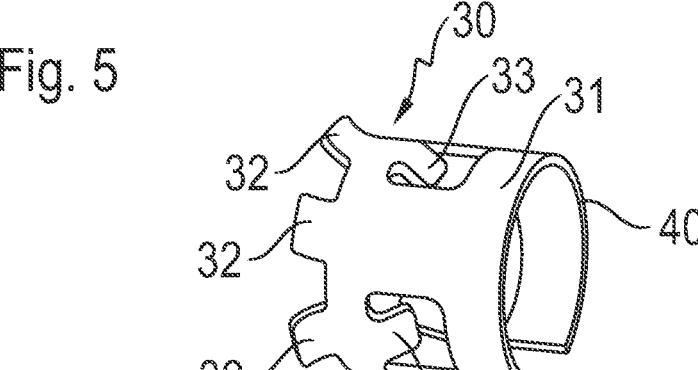
FIG. 5 is a perspective view of an exemplary arrangement of the sleeve according to the disclosure.

FIG. 4b shows an alternative configuration of the lip 34. The lip 34 is here broken by incisions, whereby a plurality of folded-over portions 35 are formed. The incisions reach approximately as far as the bending edge 41 of the lip 34, FIGS. 3 and 5 show an alternative exemplary arrangement of the sleeve 30. The sleeve 30 here does not have an end lip 34. However, it does have the above-described radially outwardly and radially inwardly bent spring arms 32, 33.

Figure 6:
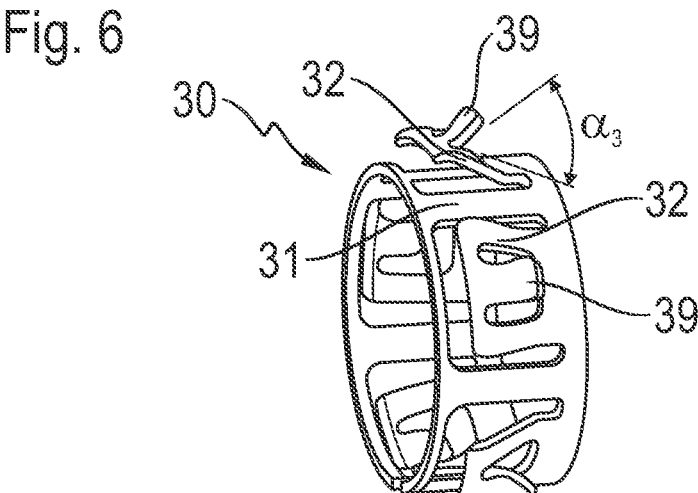
FIG. 6 is a perspective view of an exemplary arrangement of the sleeve according to the disclosure.
Figure 7:
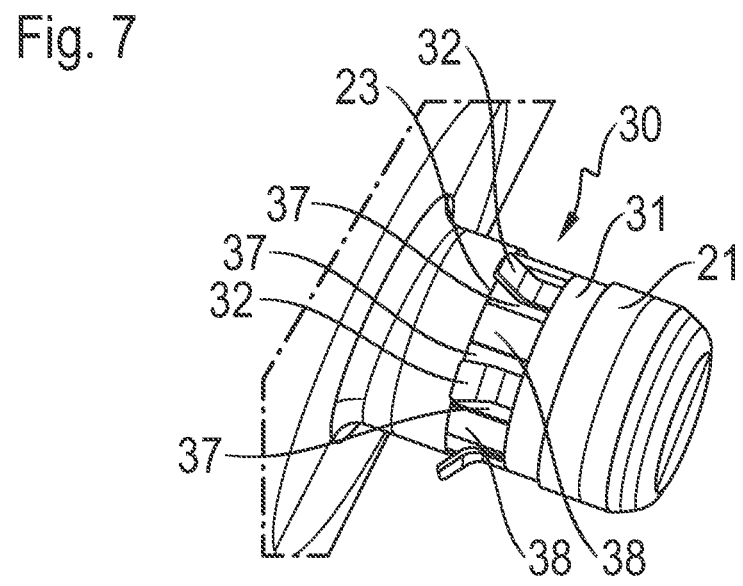
FIG. 7 is a perspective view of an exemplary arrangement of the sleeve in a mounting arrangement, according to the disclosure.

In the exemplary arrangement of the disclosure shown in FIG. 6, the sleeve 30 has outwardly bent spring arms 32 adjoining each of which there is a spring arm prolongation 39, which is integrally connected to the respective spring arm 32. The spring arm prolongations 39 are bent up with respect to the respective spring arms 32 and form a bending angle $\alpha 3$ relative thereto. When seen together with the sleeve body 31, a Z-shaped projection is thus obtained, which points radially outward away from the sleeve body. This configuration allows the spring path in the radial direction to be increased and the holding function is enhanced, FIG. 7 shows a further exemplary arrangement of the disclosure, in which the sleeve 30 with its sleeve body 31 is inserted into the pin groove 23. The pin groove 23 fixes the sleeve 30 axially. On the end face that faces the cover, the sleeve 30 has incisions 37, which are arranged spaced apart from one another along the sleeve circumference. The incisions 37 have a limited incision depth and do not cut through the sleeve 30. The sleeve webs located between the incisions 37 form, in an alternating sequence, radially outwardly bent spring arms 32 or sleeve portions 38, which are each part of the sleeve body 31. On mounting of the pin 21 into the bore 10, the spring arms 32 engage into the bore groove 12. In this exemplary arrangement too, there is a similarly advantageous force path between the pin 21 and the bore 10, or the brake caliper 1, as a result of axially offset force transmission points, which results in the corresponding parts being well supported against one another and the cover being securely held.

Figure 8A:
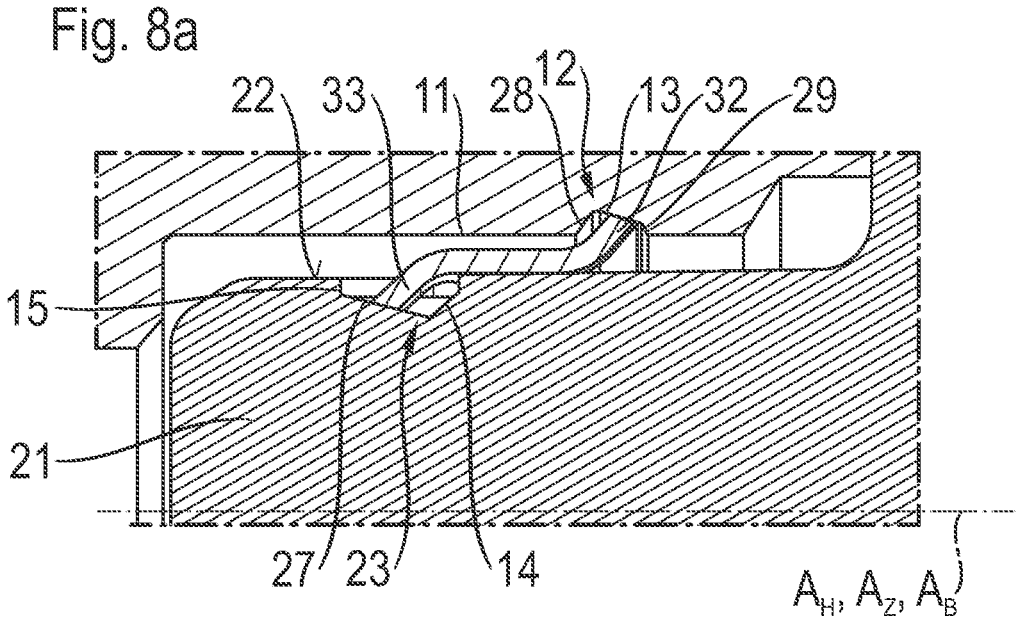
FIG. 8a shows an embodiment of the disclosure, in a sectional view.

FIG. 8a shows an exemplary arrangement of the disclosure in which the bore groove 12 and the pin groove 23 have a modified form.

The groove base 13 of the bore groove 12 is inclined relative to the bore wall 11 in such a manner that the radial distance between the bore wall 11 and the groove base 12 decreases in the direction toward the outer side 8 of the bridge finger 6. The groove base 13 thus forms an angle γ1 with the bore wall 11, or with the bore axis AB. The groove base 27 of the pin groove 23 is inclined relative to the pin circumferential surface 22 in such a manner that the radial distance between the pin circumferential surface 22 and the groove base 27 decreases in the direction toward the end face 24 of the pin 21. The groove base 27 thus forms an angle γ2 with the pin circumferential surface 22, or with the pin longitudinal axis AZ. In this exemplary arrangement, the angles γ1 and γ2 are each approximately 15°. The angles γ1 and γ2 are shown in the detail views of FIGS. 8b and 8c.

The side wall 28 of the bore groove 12 which is arranged in the direction of the bore depth of the bore 10 has an inclined position relative to a perpendicular to the bore axis AB. As a result of this inclined position, the groove width increases from the groove base 13 toward the bore wall 11, that is to say toward the opening side of the bore groove 12. The opposite side wall 29 of the bore groove 12, that is to say the side wall that is arranged in the direction of the outer side 8, likewise has an inclined position relative to a perpendicular to the bore axis AB. As a result of this inclined position, the groove width likewise increases from the groove base 13 toward the opening side of the bore groove 12.

The side wall 14 of the pin groove 23 which is arranged in the direction of the contact side 26 of the cover 20 has an inclined position relative to a perpendicular to the pin longitudinal axis AZ. As a result of this inclined position, the groove width increases from the groove base 27 toward the pin circumferential surface 22, that is to say toward the opening side of the pin groove 23. The opposite side wall 15 of the pin groove 23, that is to say the side wall that is arranged in the direction of the end face 24 of the pin 21, likewise has an inclined position relative to a perpendicular to the pin longitudinal axis AZ. As a result of this inclined position, the groove width likewise increases from the groove base 27 toward the opening side of the pin groove 23.

Figure 8B:
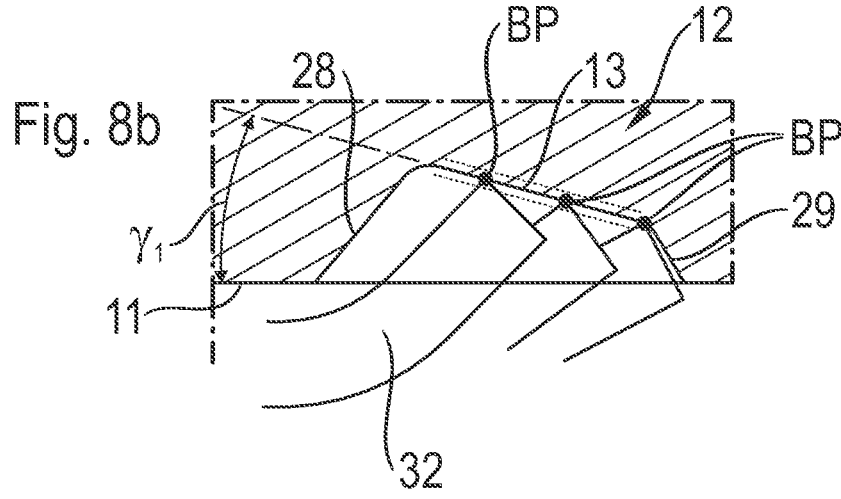
FIG. 8b is a detail view of the bore groove according to one exemplary arrangement of the disclosure.
Figure 8C:
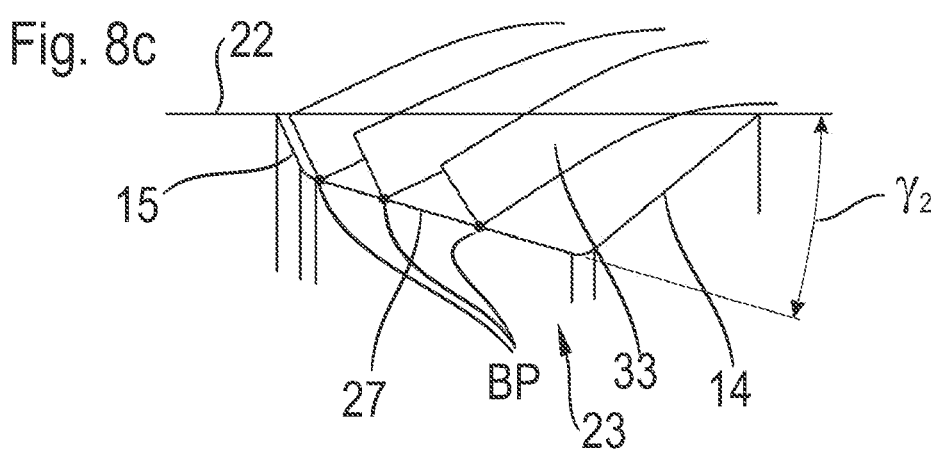
FIG. 8c is a detail view of the pin groove according to one exemplary arrangement of the disclosure.

FIGS. 8b and 8c show how spring arms which, for example as a result of manufacturing tolerances, have different lengths or which, for example for reasons related to their manufacture, may be arranged differently on the sleeve

30 can have correspondingly different contact points BP with the inclined groove bases 13, 27. The inclined profile of the groove bases 13, 27 in each case ensures that the joined components are held relative to one another reliably and without play. The inclined side walls promote secure seating of the sleeve 30 on the pin 21 and in the bore 10.

Figures 9A, 9B, 9C:
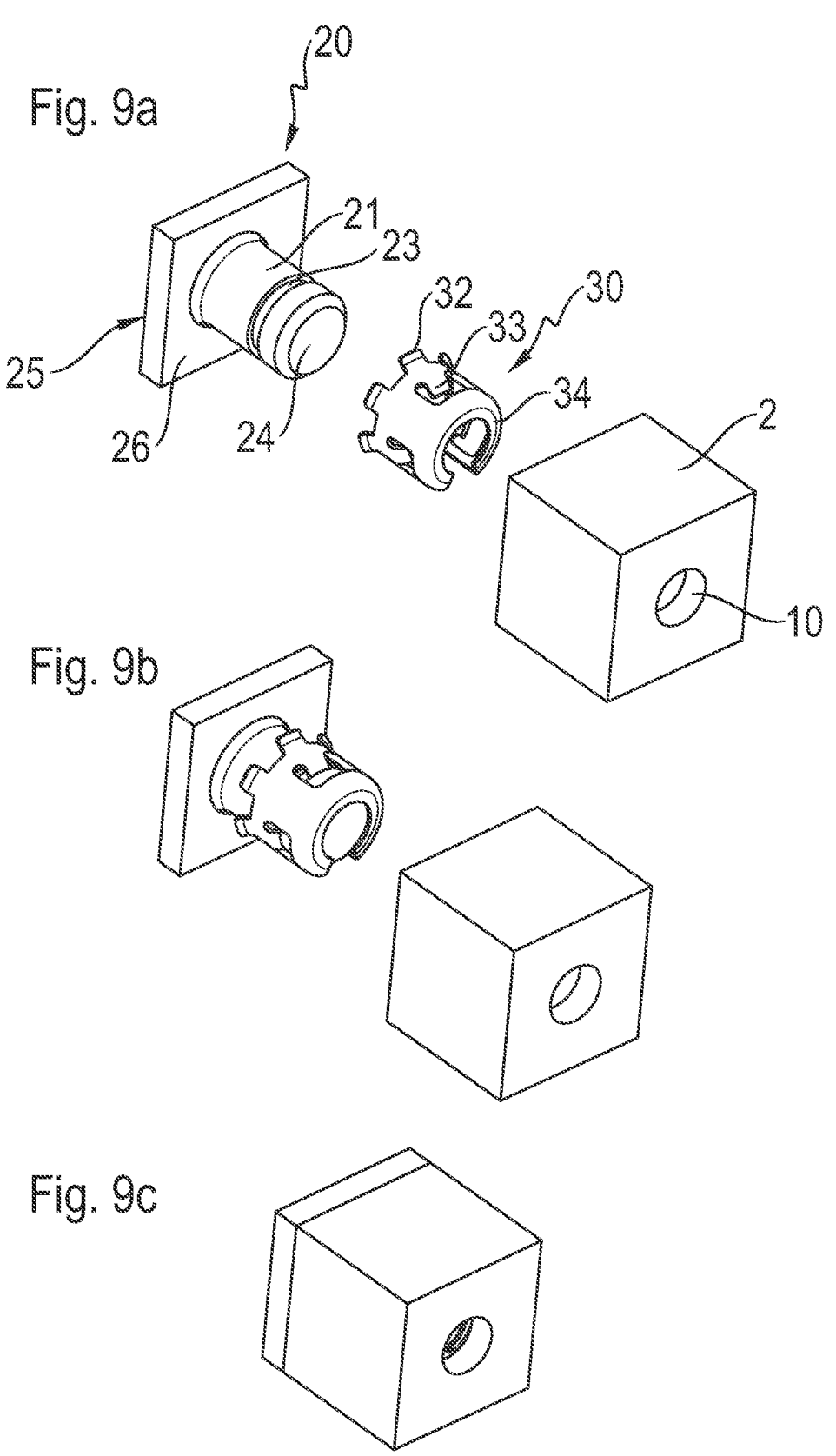
FIGS. 9a, 9b, 9c illustrate by way of example the mounting method according to the disclosure.

FIGS. 9a to 9c show the mounting process according to the disclosure. The components, in particular the cover and the brake caliper, or the bridge finger, are shown in highly schematic form. In FIG. 9a, the components have not yet been joined together. In FIG. 9b, the sleeve 30 has been fitted onto the pin 21 as far as it will go. That is to say, the lip 34 rests on the end face 24 of the pin 21 and the inwardly bent spring arms 33 engage into the pin groove 23. In FIG. 9c, the pin 21 has been inserted together with the sleeve 30 into the bore 10 and the cover rests with its contact side 26 on the outer side 8 of the bridge finger 6. Furthermore, the outwardly bent spring arms 32 engage into the bore groove 12.

The invention claimed is:

1. A brake caliper for a disk brake, comprising:
   a support structure having a bridge and at least one bridge finger which has a brake lining side, an outer side, and a bore introduced into the outer side and having a bore wall,
   a bore groove extending into the bore wall,
   a cover having a pin which projects into the bore and a pin groove extending into the pin circumferential surface, and
   a sleeve arranged between the bore wall and the pin circumferential surface and having a sleeve body, an outwardly bent spring arm, and an inwardly bent spring arm,
wherein the outwardly bent spring arm engages the bore groove and the inwardly bent spring arm engages the pin groove to secure the cover to the support structure; and
wherein the bore groove comprises a groove base that is inclined relative to the bore wall and two side walls that are not oriented at a right angle to the bore wall, such that a width of the bore groove increases from the groove base toward the bore wall.

2. The brake caliper as claimed in claim 1, wherein the pin groove comprises a groove base that is inclined relative to the pin circumferential surface such that a radial distance between the pin circumferential surface and the groove base decreases in a direction toward an end face of the pin.

3. The brake caliper as claimed in claim 1, wherein the sleeve has a sleeve longitudinal axis and wherein, in an unloaded state, a bending angle of the outwardly bent spring arm and the inwardly bent spring arm relative to the sleeve longitudinal axis is less than 90°.

4. The brake caliper as claimed in claim claim 1, wherein the sleeve comprises a lip directed inward in a radial direction on which an end face of the pin rests, and wherein the lip is formed by a plurality of folded-over portions separated by incisions.

* * * * *